(12) United States Patent
Chikumoto

(10) Patent No.: US 7,050,262 B2
(45) Date of Patent: May 23, 2006

(54) MAGNETIC RECORDING/REPRODUCING APPARATUS

(75) Inventor: Kouichi Chikumoto, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 89 days.

(21) Appl. No.: 10/634,158

(22) Filed: Aug. 5, 2003

(65) Prior Publication Data

US 2004/0027713 A1 Feb. 12, 2004

(30) Foreign Application Priority Data

Aug. 5, 2002 (JP) .................... 2002-004876 U

(51) Int. Cl.
*G11B 23/04* (2006.01)

(52) U.S. Cl. .................................... 360/96.5
(58) Field of Classification Search ............... 360/96.5
See application file for complete search history.

(56) References Cited

U.S. PATENT DOCUMENTS

| | | | |
|---|---|---|---|
| 4,918,549 A | * | 4/1990 | Katono et al. ............... 360/93 |
| 4,991,043 A | * | 2/1991 | Harumatsu et al. ........... 360/94 |
| 5,196,972 A | * | 3/1993 | Matsumaru et al. .......... 360/94 |
| 5,706,147 A | * | 1/1998 | Lee ............................ 360/96.5 |
| 5,796,563 A | * | 8/1998 | Iwano et al. ................ 360/132 |
| 5,917,675 A | * | 6/1999 | Yang ......................... 360/96.5 |
| 5,923,497 A | * | 7/1999 | Suzuki ...................... 360/96.5 |

FOREIGN PATENT DOCUMENTS

JP 7-19820 4/1995

\* cited by examiner

*Primary Examiner*—Angel Castro
*Assistant Examiner*—Mark Blouin
(74) *Attorney, Agent, or Firm*—Osha Liang LLP

(57) ABSTRACT

A magnetic recording/reproducing apparatus is provided with a lock releasing arm for depressing a lock releasing switch on a front cover of a cassette. The magnetic recording/reproducing apparatus uses a cassette positioning means for positioning a cassette until the cassette is automatically inserted, including the lock releasing arm having a claw to be in contact with a side wall on a cassette inserting direction side of a hole where the lock releasing switch is provided, and a projection to be in contact with the front face of the cassette when the cassette is inserted. When the cassette is brought into contact with the projection, the lock releasing arm depresses the lock releasing switch to position the cassette.

3 Claims, 4 Drawing Sheets

MAGNETIC RECORDING/REPRODUCING APPARATUS

BACKGROUND OF THE INVENTION

1. Field of the Invention

The present invention relates to a magnetic recording/reproducing apparatus provided with a lock releasing arm for depressing a lock releasing switch on a front cover of a cassette.

2. Description of the Related Art

In a conventional video cassette recorder (magnetic recording/reproducing apparatus), supporting of a cassette until the cassette is loaded by a cassette loading mechanism is carried out by a flat spring that presses the cassette. FIG. 4 is a plan perspective view of a portion of a video cassette recorder showing a state where a cassette is inserted. FIG. 5 is a side view of the main part of FIG. 4. FIG. 6 is a plan perspective view of the cassette and a lock releasing arm shown in FIG. 4.

In FIG. 4, the portion illustrated by a bold line represents a cassette 10, and an arrow "A" represents the direction of inserting the cassette 10. Within the cassette 10, a lock piece 12 equipped with a lock releasing switch 11 for a front cover is provided as shown in FIG. 6. The lock releasing switch 11 exposed to outside through a hole 13. The front cover cannot be opened unless the lock releasing switch 11 is depressed.

The video cassette recorder 20 includes a holder 21 on which the cassette 10 is placed when it is inserted, a projection 22a which comes into contact with the front cover of the cassette 10 for positioning the cassette 10, a flat spring 23 for pressing the upper face of the cassette 10 in a direction of arrow "B" to support the cassette 10, and a lock releasing arm 24 equipped with a claw 24a and urged in a counter clock wise direction in FIG. 4 for depressing the lock releasing switch 11 when the cassette 10 is inserted.

An explanation will be given of a process of inserting the cassette 10 into the video cassette recorder 20. The cassette 10, while it is pressed by the flat spring 23, is inserted by a user. At almost the same time as the front cover of the cassette 10 is brought into contact with the projection 22a, the lock releasing switch 11 is depressed by the claw 24a of the lock releasing arm 24. Thereafter, the cassette 10 is automatically loaded.

Such a vide cassette recorder is disclosed in, e.g., JP-UM-7-19820.

In the manual process until the cassette 10 is automatically loaded, the cassette 10 is not completely fixed. This will be explained referring to FIG. 5. The cassette 10 is supported by the projection 22a in an inserting direction (arrow "A"), and supported by the flat spring 23 in the direction of arrow "B". However, the cassette 10 can be easily moved in an ejecting direction (arrow "C"). Even in a case where the lock releasing arm 24 is engaged with the hole 13, since there is a play (space) between the hole 13 and the claw 24a, the cassette 10 may move to the corresponding degree in the direction of arrow "C".

After the cassette 10 is inserted by the user and the lock releasing switch 11 is depressed, the cassette 10 is automatically loaded. However, in a case where the cassette 10 shifts by the degree of the play in the direction of arrow "C" immediately before the cassette 10 is automatically loaded, a problem occurs that the cassette 10 may not be loaded at a prescribed position.

SUMMARY OF THE INVENTION

In view of the above problem, an object of the present invention is to provide a magnetic recording/reproducing apparatus capable of always loading a cassette at a prescribed position without using a flat spring that does not assure the fixing of the cassette.

In order to attain the above object, the present invention provides a magnetic recording/reproducing apparatus including: a lock releasing arm having a claw for depressing a lock releasing switch on a front cover of a cassette, the claw depressing the lock releasing switch through a hole formed in the cassette; and a projection to be in contact with a front face of the cassette when the cassette is inserted into the magnetic recording/reproducing apparatus, wherein when the cassette is brought into contact with the projection, the lock releasing arm depresses the lock releasing switch, and a side wall on a cassette inserting direction side of the claw comes into contact with a side wall on the cassette inserting direction side of the hole to position the cassette until the cassette is automatically loaded.

In accordance with this configuration, the cassette is fixed in a cassette inserting direction by the projection and fixed in a cassette ejecting direction by the lock releasing arm. Therefore, the cassette is completely fixed with no play and will not shift. In the subsequent automatic loading, the cassette is always loaded at a prescribed position. In accordance with this structure, it is not necessary to use the conventional flat spring and so possible to reduce the number of components, thereby reducing the production costs.

The invention further provides a magnetic recording/reproducing apparatus including: a lock releasing arm having a claw for depressing a lock releasing switch on a front cover of a cassette, the claw depressing the lock releasing switch through a hole formed in the cassette, wherein a side wall on a cassette inserting direction side of the claw comes into contact with a side wall on the cassette inserting direction side of the hole to position the cassette until the cassette is automatically loaded.

In accordance with this configuration, since the lock releasing arm is employed as the cassette positioning means, unlike the related art, it is unnecessary to fix the cassette by a flat spring. In the subsequent automatic loading, the cassette is always loaded at a prescribed position.

The above magnetic recording/reproducing apparatus may further includes a projection to be in contact with a front face of the cassette when the cassette is inserted into the magnetic recording/reproducing apparatus, wherein when the cassette is brought into contact with the projection, the lock releasing arm depresses the lock releasing switch, and the side wall on the cassette inserting direction side of the claw comes into contact with the side wall on the cassette inserting direction side of the hole.

In accordance with this configuration, the cassette is fixed in a cassette inserting direction by the projection and fixed in a cassette ejecting direction by the lock releasing arm. Therefore, the cassette is completely fixed with no play and will not shift. In the subsequent automatic loading, the cassette is always loaded at a prescribed position.

DETAILED DESCRIPTION OF THE PREFERRED EMBODIMENTS

Figure 1:
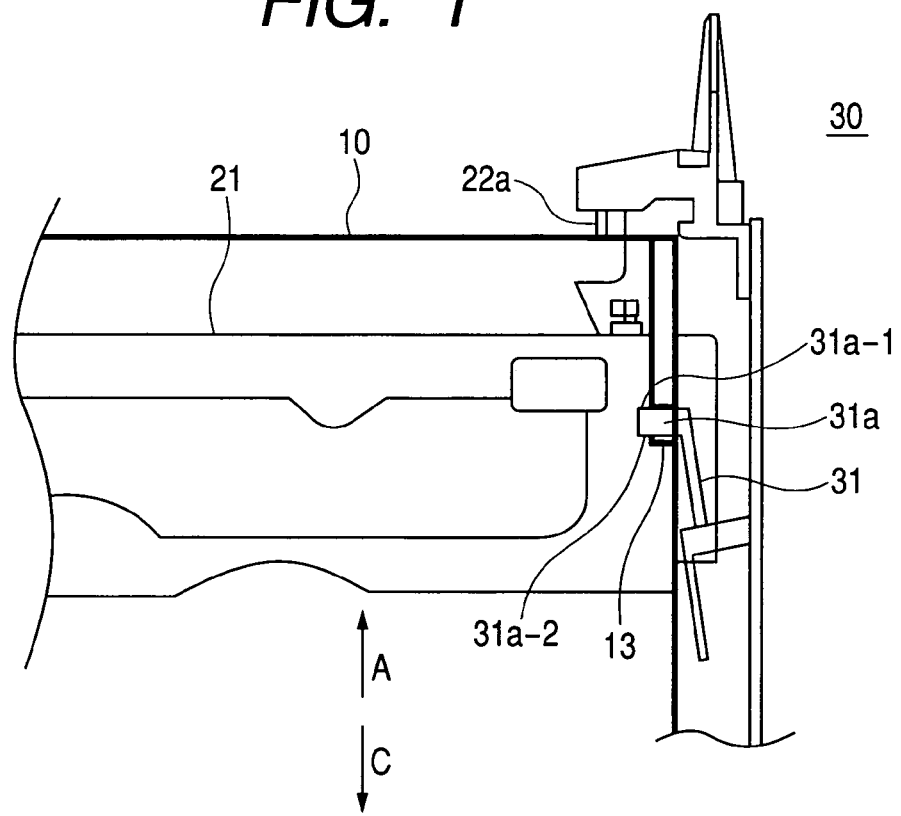
FIG. 1 is a plan perspective view showing a portion of a video cassette recorder in a state where a cassette is inserted, which is an embodiment of the invention.

Now, an explanation will be given of an embodiment of the invention referring to the accompanying drawings. For convenience of explanation, like reference numerals refer to like parts in the related art described above.

FIG. 1 is a plan perspective view of a portion of a video cassette recorder 30 showing a state where a cassette is inserted.

Figure 2:
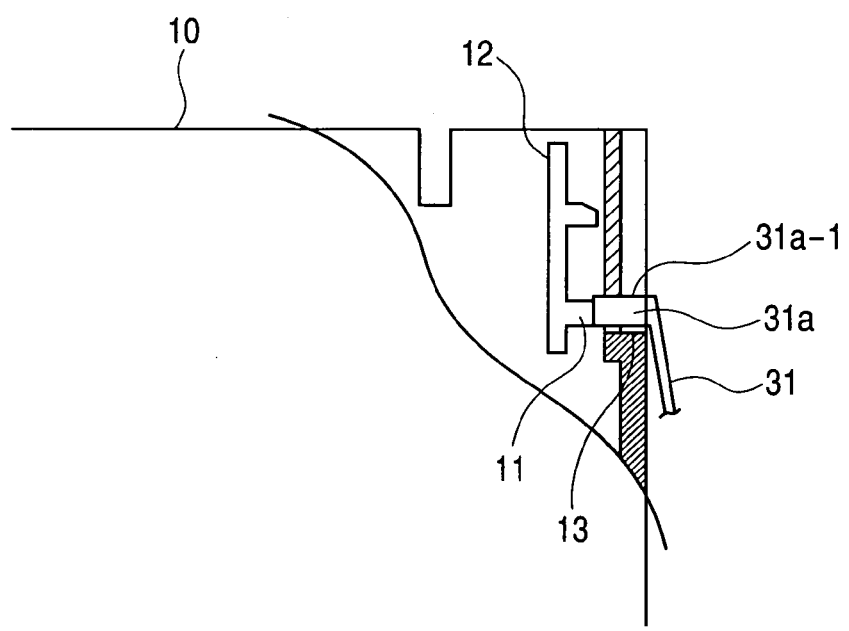
FIG. 2 is a plan perspective view of the cassette and a lock releasing arm shown in FIG. 1.

FIG. 2 is a plan perspective view of the cassette and a lock releasing arm shown in FIG. 1. A video cassette recorder 30 according to this embodiment is different from the related art video cassette recorder in the shape of the lock releasing arm 31.

The lock releasing arm 31 has a claw 31a extending toward a direction substantially orthogonal to an inserting direction "A" and an ejecting direction "C". The claw 31a has one side wall 31a-1 on an inserting direction side and the other side wall 31a-2 on an ejecting direction side. As shown in FIG. 2, the side wall 31a-1 is formed into a plane which comes into contact with a side wall of a hole 13 when the cassette 10 is inserted. Where the cassette 10 is inserted into the video cassette recorder 30 by a user, nearly simultaneously when the front face of the front cover of the cassette 10 is brought into contact with a projection 22a, a lock releasing switch 11 is depressed by the claw 31a of a lock releasing arm 31. At this time, the planar side wall 31a-1 of the claw 31a comes into contact with the side wall of the hole 13 on the inserting direction side (the side of arrow "A").

Thus, the cassette 10 is fixed in the direction of arrow "A" by the projection 22a and fixed in the direction of arrow "C" by the lock releasing arm 31. Therefore, the cassette 10 is completely fixed with no play and will not shift. In the subsequent automatic loading, the cassette 10 is always loaded at a prescribed position. In accordance with this structure, it is not necessary to use the conventional flat spring 23 and so possible to reduce the number of components, thereby reducing the production costs.

Figure 3:
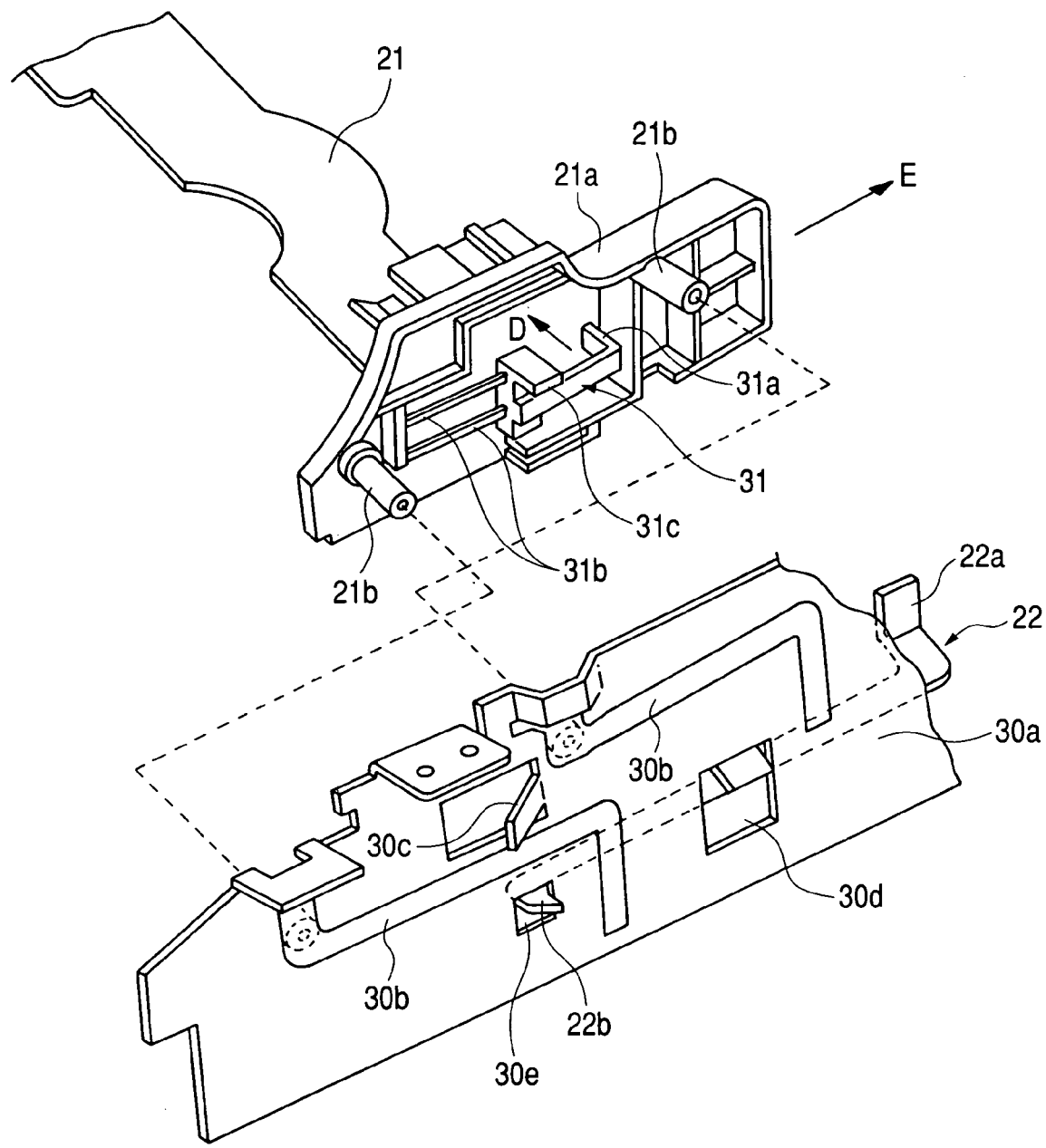
FIG. 3 is an exploded perspective view showing the video cassette recorder.
Figure 4:
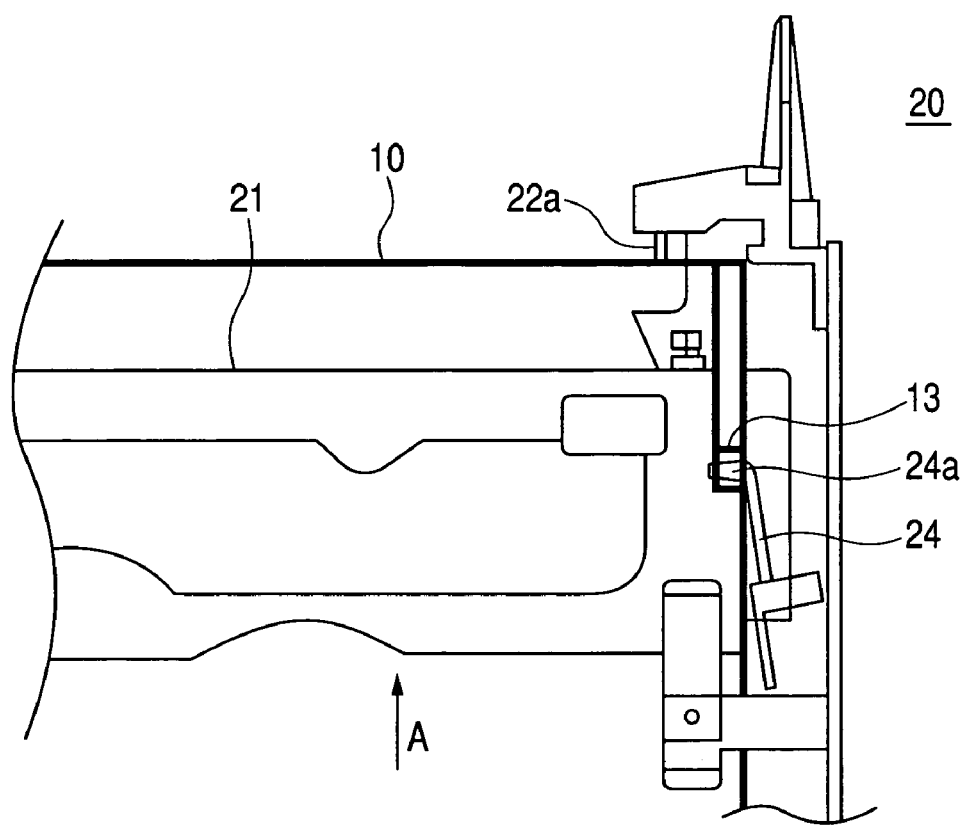
FIG. 4 is a plan perspective view showing a portion of a video cassette recorder in a state where a cassette is inserted.
Figure 5:
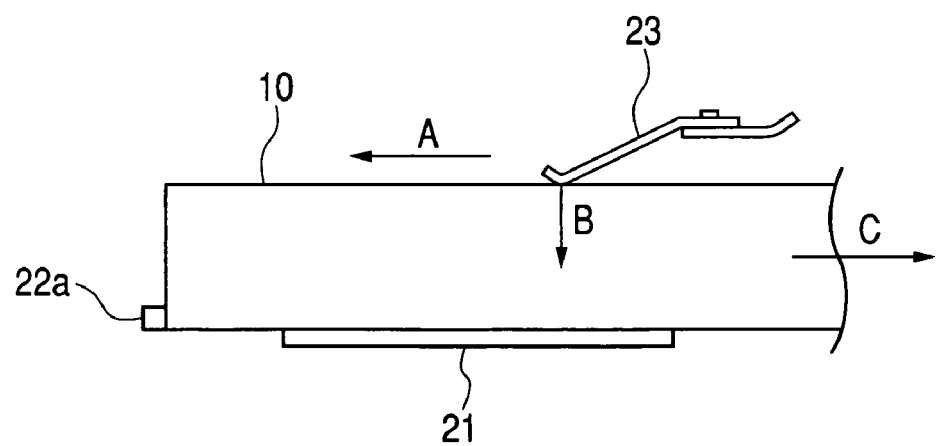
FIG. 5 is a side view showing the main part of FIG. 4.
Figure 6:
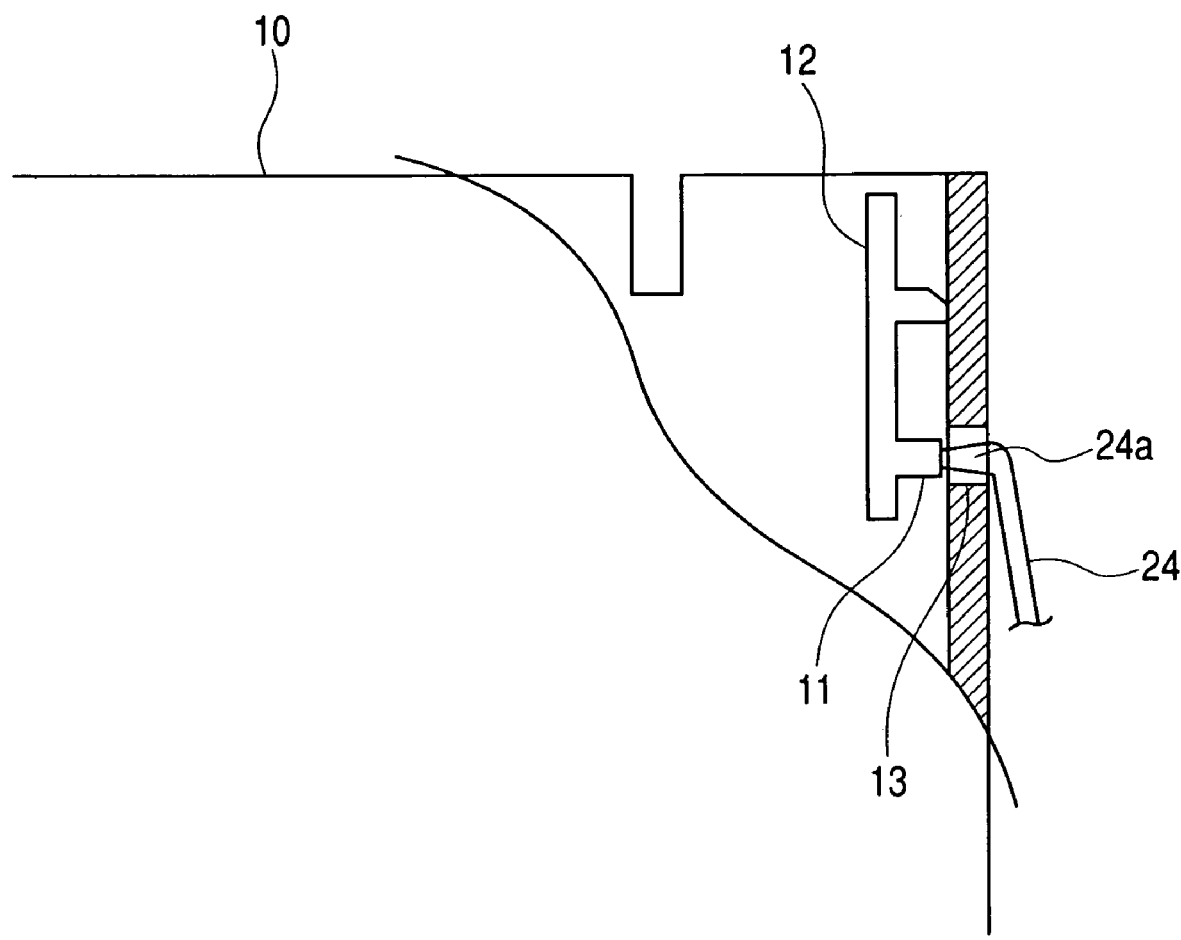
FIG. 6 is a plan perspective view showing the cassette and a lock releasing arm shown in FIG. 4.

As shown in FIG. 3, a slider 21a is disposed on one end of the holder 21. The lock releasing arm 31 is integrally formed with the slider 21a. The lock releasing arm 31 has an elastic leg 31b that has a base end supported by the slider 21a.

In a frame side face 30a of the video cassette recorder 30, there are formed a pair of guide grooves 30b in which a pair of guide pins 21b disposed on the slider 21a slidably fit, respectively. The frame side face 30a has a slanted face 30c against which a sliding portion 31c disposed on the lock releasing arm 31 is abuttable.

In inserting the cassette 10 while placing the cassette 10 on the holder 21, at the beginning, the claw 31a does not project toward the cassette (in a direction of arrow "D") from the slider 21a. When the projection 22a disposed on one end of a stopper member 22 is pushed in accordance with the insertion of the cassette 10, an engaging claw 22b disposed on the other end of the stopper member 22 is released from engagement with an engaging hole 30e formed in the frame side face 30a. Then, as the slider 21a moves in a direction of arrow "E", the sliding portion 31c comes into contact with the slanted face 30c and slides on the slanted face 30c. In accordance with this slide, the claw 31a of the lock releasing arm 31 projects toward the cassette 10 (in the direction of arrow "D") while resisting against the elasticity of the elastic leg 31b, thereby depressing the lock releasing switch 11. The stopper member 22 is rotatably supported by a shaft projecting from an under face of the slider 21a.

Incidentally, the shape of the lock releasing arm 31 is not limited as long as it can depress the lock releasing switch 11 and can come into contact with the side wall of the hole 13 when the cassette 10 is brought into contact with the projection 22a. The side wall 31a-1 of the claw 31a may be an arc-like face instead of a planner face. The claw 31a need be in contact with the side wall in the direction of arrow "A" of the hole 13. Even when there is a play (space) between the claw 31a and the side wall of the hole 13 in the direction of arrow "C", this play is not problematic.

In accordance with this invention, by modifying the shape of the conventional lock releasing arm, there can be provided a magnetic recording/reproducing apparatus which can always load a cassette at a prescribed position. Further, it is not necessary to use the conventional flat spring, and so possible to reduce the number of components, thereby reducing the production costs.

What is claimed is:

1. A magnetic recording/reproducing apparatus comprising:

a lock releasing arm having a claw for depressing a lock releasing switch on a front cover of a cassette, the claw depressing the lock releasing switch through a hole formed in the cassette; and a projection to be in contact with a front face of the cassette when the cassette is inserted into the magnetic recording/reproducing apparatus, wherein when the cassette is brought into contact with the projection, the lock releasing arm depresses the lock releasing switch, and a sidewall on a cassette inserting direction side of the claw comes into contact with a side wall on the cassette inserting direction side of the hole to position the cassette until the cassette is automatically loaded.

2. A magnetic recording/reproducing apparatus comprising:

a lock releasing arm having a claw for depressing a lock releasing switch on a front cover of a cassette, the claw depressing the lock releasing switch through a hole formed in the cassette, wherein a side wall on a cassette inserting direction side of the claw comes into contact with a side wall on the cassette inserting direction side of the hole to position the cassette until the cassette is automatically loaded.

3. The magnetic recording/reproducing apparatus according to claim 2, further comprising a projection to be in contact with a front face of the cassette when the cassette is inserted into the magnetic recording/reproducing apparatus, wherein when the cassette is brought into contact with the projection, the lock releasing arm depresses the lock releasing switch, and the side wall on the cassette inserting direction side of the claw comes into contact with the side wall on the cassette inserting direction side of the hole.

* * * * *